No. 732,720. PATENTED JULY 7, 1903.
H. DUNCAN & R. R. SHERRIFF.
APPARATUS FOR SEPARATING LIQUIDS FROM SOLIDS.
APPLICATION FILED JULY 22, 1902.
NO MODEL. 3 SHEETS—SHEET 2.
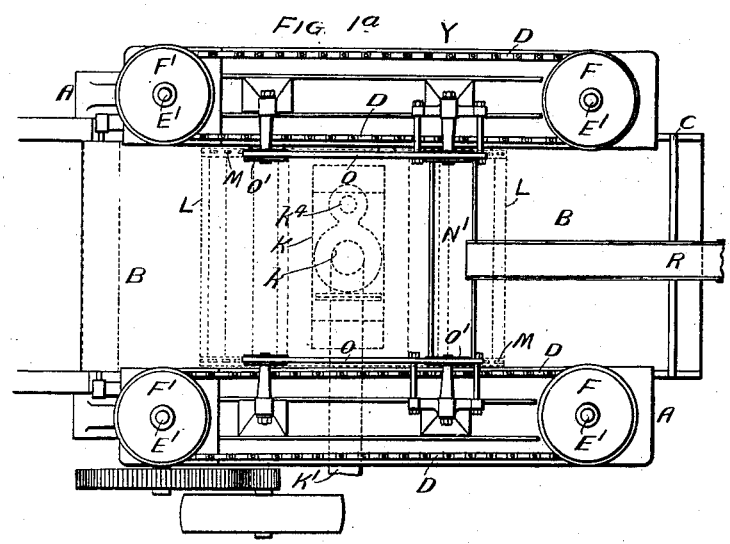
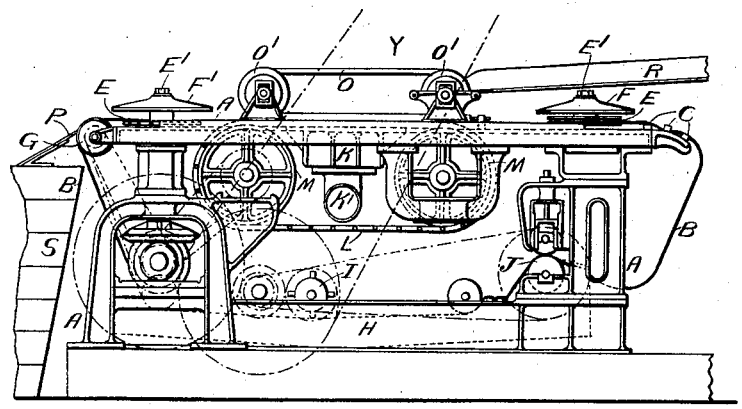

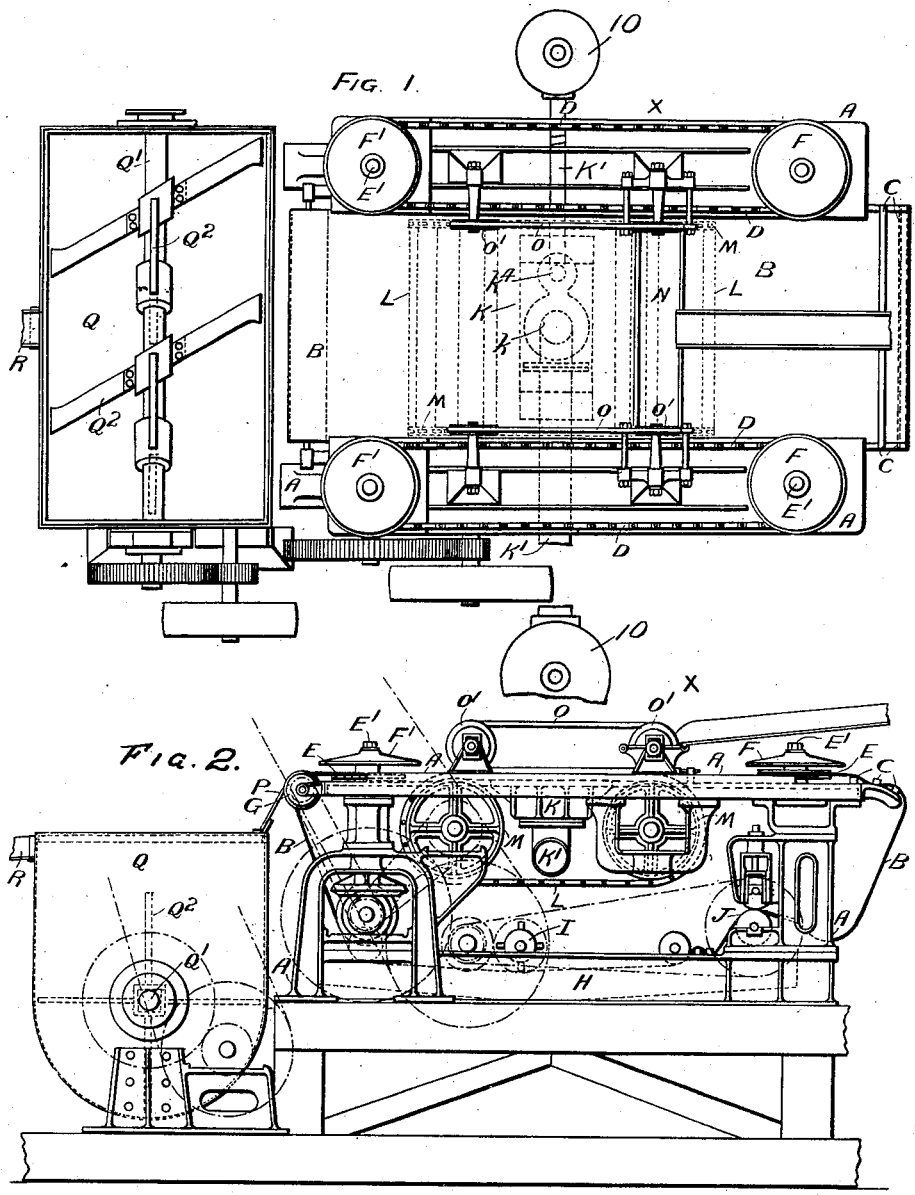

No. 732,720. PATENTED JULY 7, 1903.
H. DUNCAN & R. R. SHERRIFF.
APPARATUS FOR SEPARATING LIQUIDS FROM SOLIDS.
APPLICATION FILED JULY 22, 1902.
NO MODEL. 3 SHEETS—SHEET 3.
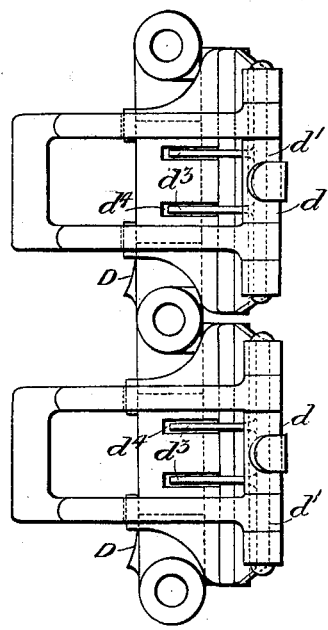
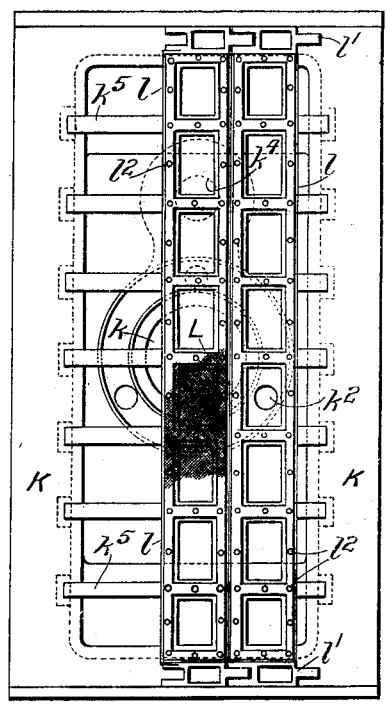
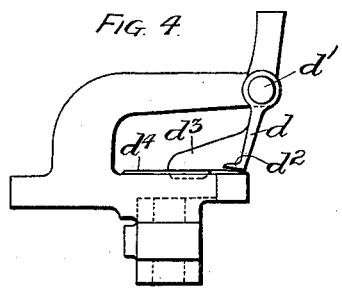
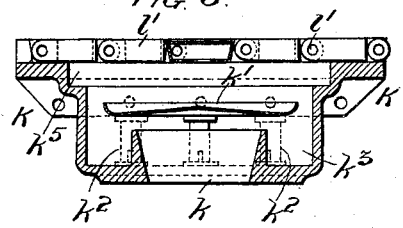

No. 732,720.

Patented July 7, 1903.

UNITED STATES PATENT OFFICE.

HUGH DUNCAN AND ROBERT RANKIN SHERRIFF, OF GLASGOW, SCOTLAND.

APPARATUS FOR SEPARATING LIQUIDS FROM SOLIDS.

SPECIFICATION forming part of Letters Patent No. 732,720, dated July 7, 1903.

Application filed July 22, 1902. Serial No. 116,574. (No model.)

*To all whom it may concern:*

Be it known that we, HUGH DUNCAN and ROBERT RANKIN SHERRIFF, subjects of the King of the United Kingdom of Great Britain and Ireland, residing at 11 Hampden Terrace, Mount Florida, Glasgow, and 26 Queen Square, Strathbungo, Glasgow, Scotland, have invented certain new and useful Improvements in Apparatus for Separating Liquids from Solids, (for which applications for patents have been made in Great Britain, No. 26,667, dated December 31, 1901; in Transvaal February 4, 1902; in New South Wales March 6, 1902; in Queensland March 8, 1902; in South Australia March 10, 1902, and in Western Australia March 18, 1902,) of which the following is a specification.

This invention relates to apparatus for separating the liquid from the solid constituents of such mixtures as the slimes or tailings produced in milling gold-bearing ores.

It consists of a separating plant comprising two or more machines specially organized and arranged to convey the mixture over a properly-supported endless band of filter-cloth, through which the liquid containing the precious metal in solution is drawn off by suction into a vacuum box or boxes and thence to a tank, the solid matters being delivered into a washing and mixing-chamber, from which, after treatment therein, it is delivered onto a second filter-band and the liquid containing any residue of the precious metal is drawn off by suction, the residual solids being deposited in a bin or other receptacle.

The invention also comprises improvements in details of the machines, such as means for stretching out the filter-band transversely during its traverse across the machine and for releasing it upon completion of such traverse, and the provision of an endless band of wire-cloth or like material traversed under and along with the filter-band and interposed between the latter and the vacuum-box to properly support the filter-cloth and prevent undue wear and strain upon it by the action of the suction apparatus.

In the accompanying drawings, Figures 1 and 1ª are top plan views of the machine. Fig. 2 is a side elevation of the machine. Fig. 2ª is a side elevation of the construction shown in Fig. 1ª. Figs. 3 and 4 are respectively a plan and elevation showing the construction of the clips employed for engaging the edges of the endless band of filter-cloth during its passage over the vacuum-box; and Figs. 5 and 6 are respectively a plan and cross-section of one of the improved vacuum-boxes, showing part of the endless band of wire-gauze and the chains for traversing it.

As shown by the drawings, the improved separating plant is composed of two machines X and Y, which are alike in construction and operation, one being situated at a higher level than the other and having a washing and mixing chamber interposed, so that the solid residue left after extraction of the liquid in the mixture carried through the first machine is washed and mixed with water with or without the addition of chemical reagents in the mixing-chamber, and the overflowing mixture is subjected to treatment for separation of the liquid in the second machine. Each machine X and Y comprises a framing A of convenient construction for carrying the driving-gear and other parts and on which are mounted a series of rollers for driving and guiding an endless band, B of filter-cloth, extending horizontally over the framing, the said band being spread transversely at the entering and over spreaders C, so that its edges are brought within engaging clips or like securing devices carried by or forming part of endless chains D D, passing around pulleys E on rotating shafts E' at each side of the machine. By the action of cams or disks F on each of the shafts at one end of the machine the clips $d$ are automatically opened up to admit the edges of the band, on which they close, as hereinafter described, to hold it stretched as it travels, and by a second set of cams or disks F' at the opposite end of the machine the clips are again automatically opened up to release the edges of the cloth. From the delivery end of the machine the endless filter-band B passes around a guide-roller G and thence downward and through a trough or water-box H, where it is washed by a revolving beater I and passes to a pair of nipping rolls or squeezers J and thence back to the entering end of the machine, suitable guide-rollers being interposed. In its traverse the band D passes over a vacuum-box or suction-chamber K, extending close on the full width of the band and horizontally under it, this box being connected by piping K' to a vacuum-pump 10. The vacuum-box K, as shown to a larger scale at Figs. 5 and 6, is specially constructed to avoid drawing off the solution, along with air, to the vacuum-pump, for which purpose the outlet $k$ to the said pump is trapped, or formed with an upwardly-projecting rim over which is situated a baffle-disk $k'$, having drain-pipes $k^2$ led into the trap $k^3$, which communicates with the outlet $k^4$, leading to a pump which draws off the solution or liquid. Across the upper face of the vacuum-box K guide-bars $k^5$ are fitted to support the endless band L, of wire cloth or gauze, which is interposed between the filter-band B and the vacuum-box. The wire-gauze band L is carried by rotating pulleys or sprocket-wheels M and is composed of a series of frames $l$, attached to jointed links $l'$, forming a continuous chain on each side, the wire-gauze being attached by rivet-pins $l^2$ or like means to the frames $l$. The wire-gauze band L is preferably arranged to travel at the same speed as the filter-band B to avoid friction, and it serves to support the portion of the band B which for the time being is subjected to the action of the vacuum in passing over the vacuum-box.

The slimes or other mixture from which the liquid is to be extracted is fed to the traveling band B through a feeder-box N, which serves to distribute it evenly, a pair of deckle-straps O, carried upon pulleys O', being provided to prevent the mixture passing over the edges of the band, and as the material is carried by the band over the vacuum-box the liquid contained in it is drawn through the filter-cloth into said box, from which it drains to the solution pump or tank, leaving a cake of dry material on the surface of the band, which is removed at the delivery end by a scraper P and drops into a washing and mixing tank Q. In this tank the solid matter is washed and mixed with water, the action being facilitated by means of a rotating shaft Q', extending through the tank and furnished with beater-arms $Q^2$. From this washing-tank the mixture overflows through a duct R to a fender-box N' on the second machine Y, where the operation of separating the liquid from the solid constituents of the mixture is repeated, and the solid residue is removed from the band B of this machine by a scraper P and falls into a residue-bin S.

The clips $d$, which engage the edges of the band B and serve to secure it, are, as shown at Figs. 3 and 4, each fitted on a link of the endless chain D, which is composed of a series of the links jointed together, each clip being pivoted on a pin $d'$ on an overhanging arm of the link and being formed with a bearing and gripping heel $d^2$, from which project toe-pieces $d^3$, normally entering notches $d^4$ in the sole of the chain-link D. The clip $d$ tilts to allow the edges of the band B to enter freely, and so long as the toe-pieces $d^3$ rest on the fabric the heel $d^2$ is a short distance above the sole of the link D and the clips do not engage the fabric; but immediately the fabric is drawn clear of the toe-pieces, so that they are free to drop into the notches $d^4$, the edge of the fabric is gripped and held by the heel $d^2$ between it and the sole of the link D. The pivoted clips are opened up by the action on their upper ends of the cams or disks F and F' to admit the edges of the band B as it passes toward the vacuum-box and to release the edges after it has passed over the vacuum-box.

Having now described our invention, what we claim, and desire to secure by Letters Patent, is—

1. A machine for separating liquids from solids comprising in combination a framing and gear carrying and traversing an endless band of filter-cloth, automatic clip devices for securing the band, a vacuum-box or suction-chamber located upon the under surface of said band and an interposed endless band of wire cloth or gauze arranged to support and travel with the filter-band substantially as described.

2. In a machine for separating liquids from solids, the combination with an endless traveling band, of filter-cloth of securing clip-chains arranged to automatically engage and release the edges of the cloth, a vacuum-box or suction-chamber close beneath said band, and an interposed band or wire-gauze and guide-bars across the upper face of the vacuum-box to support the filter-band over the vacuum-box, substantially as described.

3. In apparatus for separating liquids from solids, the combination with an endless traveling band of filter-cloth, of securing clip-chains constructed and arranged to automatically engage and release the edges of the cloth.

4. The combination with apparatus of the class set forth for separating liquids from solids, of a traveling band of filter-cloth, a vacuum-box located beneath said traveling band, an air-suction pump, a solution-pump, a pipe forming the outlet from the vacuum-box to the air-suction pump, an upwardly-projecting rim on said pipe, a baffle-disk over said rim, a trap formed around said outlet-pipe, drain-pipes connecting said trap and said baffle-disk and an outlet from the trap to the solution pump or tank, substantially as and for the purpose set forth.

In witness whereof we have hereunto set our hands in presence of two witnesses.

HUGH DUNCAN.
ROBERT RANKIN SHERRIFF.

Witnesses:
WALLACE FAIRWEATHER,
WALLACE CRANSTON FAIRWEATHER.